United States Patent
Renner et al.

(10) Patent No.: US 6,469,276 B1
(45) Date of Patent: *Oct. 22, 2002

(54) CONTROL OF WELD AND AUXILIARY POWER OUTPUT OF A GENERATOR TYPE WELDING POWER SUPPLY

(75) Inventors: Ross Renner, Black Creek, WI (US); Alan Smith, Fremont, WI (US); Rob Williams, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 25 days.

This patent is subject to a terminal disclaimer.

(21) Appl. No.: 09/717,558

(22) Filed: Nov. 21, 2000

Related U.S. Application Data

(63) Continuation of application No. 09/315,166, filed on May 20, 1999, now Pat. No. 6,153,855.

(51) Int. Cl.[7] .................................................. B23K 9/10
(52) U.S. Cl. ................................... 219/133; 219/130.21
(58) Field of Search .......................... 219/133, 130.21, 219/134, 137 PS

(56) References Cited

U.S. PATENT DOCUMENTS

| | | | |
|---|---|---|---|
| 3,593,121 A | | 7/1971 | Jones |
| 3,770,976 A | * | 11/1973 | Stroud et al. ............... 219/133 |
| 3,829,652 A | | 8/1974 | Terry |
| 4,268,788 A | | 5/1981 | Takeda et al. |
| 4,314,195 A | * | 2/1982 | Muter ......................... 219/133 |
| 4,529,864 A | | 7/1985 | Bennett |
| 4,663,536 A | | 5/1987 | Roesel, Jr. et al. |
| 4,904,841 A | * | 2/1990 | English ....................... 219/133 |
| 5,198,698 A | | 3/1993 | Paul et al. |
| 5,506,492 A | | 4/1996 | Harris |
| 5,734,147 A | | 3/1998 | Bunker et al. |
| 6,153,855 A | * | 11/2000 | Renner et al. ............... 219/133 |

* cited by examiner

*Primary Examiner*—Clifford C. Shaw
(74) *Attorney, Agent, or Firm*—George R. Corrigan

(57) ABSTRACT

A method and apparatus for providing a welding output and an auxiliary output from a generator having a field winding, an auxiliary output winding and a welding output winding is disclosed. One or both of a welding output and an auxiliary output are detected, and feedback signals indicative of the presence or absence of one or both of a welding output and an auxiliary output are provided. A controller, preferably an electronic field controller includes an auxiliary output regulator enabled or disabled by the output detector feedback signal and a welding regulator enabled or disabled by the output detector feedback, such that one and only one of the auxiliary output regulator and welding regulator is enabled. The auxiliary output regulator is connected to an auxiliary output feedback circuit, thereby providing closed loop control, preferably with a CV output. A maximum auxiliary power output is available in the absence of the welding output, and less then the maximum auxiliary power output is available in the presence of the welding output.

27 Claims, 5 Drawing Sheets

CONTROL OF WELD AND AUXILIARY POWER OUTPUT OF A GENERATOR TYPE WELDING POWER SUPPLY

This is a continuation of Application No. 09/315,166, filed on May 20, 1999, which issued as U.S. Pat. No. 6,153,855 on Nov. 28, 2000.

FIELD OF THE INVENTION

The present invention relates generally to the art of engine driven power supplies. More specifically, it relates to controlling auxiliary and main (such as welding) outputs using electronic control.

BACKGROUND OF THE INVENTION

Engine driven welding power supplies may be driven either by a DC generator or an AC generator (also called an alternator-rectifier). An AC generator generally includes, in addition to an alternator, a reactor followed by rectifiers to provide a DC output. AC driven welding power supplies are, generally, constant current type machines and the output volt-ampere characteristic of an AC driven welding power supply typically has a very steep slope. That is, the output current is nearly constant over a varying range of output voltage. Some welding processes are well suited for such an output. Other processes are not as well suited to a CC output, and are best performed with a set of output V-A curves having a single open circuit output voltage, then having a sloping characteristic down to a predetermined voltage level, then having a vertical characteristic (i.e., constant current) over a range of output voltages, and then again having a sloping characteristic to provide high output current for short circuit (i.e., tight arc) conditions.

One prior art generator driven welding power supply that can be used for a variety of processes is described in U.S. Pat. No. 5,734,147, entitled Method And Apparatus For Electronically Controlling The Output Of A Generator Driven Welding Power Supply, issued to Bunker et al., on Mar. 31, 1998, and is owned by the owner of this invention. U.S. Pat. No. 5,734,147 is hereby incorporated by reference, and discloses a power supply having output characteristics (also known as volt-ampere or V-A curves) that are shaped by simultaneously monitoring the output current of the welding supply and the generator output voltage and then controlling the generator field current based on the monitored information in conjunction with control reference inputs. In addition to shaping the V-A curves, the monitor and control circuits determine the transient response of the welding power supply which permits the output current to change rapidly in response to output voltage changes. This feature provides the user with more accurate control of the welding arc current. The monitor and control circuits also provide a constant, stable open circuit output voltage that provides a consistent characteristic for igniting the welding arc. Further, the monitor and control circuits compensate and stabilize the welding power supply during short circuit conditions. The controller may shape the output curves to emulate a DC generator, for example by causing the welding output V-A curves to have multiple breakpoints, and/or a substantially preset slope over a welding range wherein the preset slope does not vary over the output current range of the power supply. Also, the slope of the V-A output curve below the welding range may be different than the slope in the welding range.

Many generator driven welding power supplies provide a 110-VAC, 240 VAC, 480 VAC, single or three phase, auxiliary power output. Such power sources are used for hand tools, lights, etc. Because the devices powered by the auxiliary power are designed to operate using line current, it is desirable to provide a "flat" V-A curve, i.e., a constant voltage, regardless of the current draw. This is in direct contrast to the output desirable for many welding application. Accordingly, it is desirable to provide a generator driven welding power supply that provides a droop in the welding output, but a flat auxiliary output.

U.S. Pat. No. 5,734,147 taught to use a generator that inherently provides a CV output (for a given RPM) so the auxiliary voltage was generally CV. Then, the welding output is controlled using electronic field control to be CC (or whatever shape desired). Additionally, the auxiliary voltage is controlled using a frequency to voltage converter providing an output indicative of engine speed. A welding regulator uses the f-v output to control an auxiliary voltage. Assuming the auxiliary voltage is proportional to the engine RPM, the proper auxiliary voltage is obtained. While this system is better than other prior art systems, it does not provide for closed loop control of the auxiliary voltage. When the welding output is active, a closed loop auxiliary voltage control may not be desirable, as it could adversely affect the welding output control. However, when the welding output is not active, a closed loop auxiliary voltage control could be used, and would likely be more accurate than prior art open loop controls.

Another problem with auxiliary output is that when the auxiliary power demand suddenly increases, and the engine is in idle, it could cause the engine to stall.

Accordingly, an engine driven welding power supply with a closed loop control of auxiliary voltage, when the welding output is inactive, is desired. Preferably, such a control would utilize electronic field control, and would build on the weld output control, so as to avoid unnecessary expense and complication. Also, such a system would preferably include an auxiliary power controller that delayed or inhibited full power when the engine is idling, so as to reduce the likelihood of a stall.

SUMMARY OF THE PRESENT INVENTION

According to one aspect of the invention a generator driven welding power supply provides a welding output and an auxiliary output, and includes a generator having a field winding, an auxiliary output winding and a welding output winding. An output detector detects one or both of a welding output and an auxiliary output, and provides feedback signals indicative of the presence or absence of one or both of a welding output and an auxiliary output. A controller includes an auxiliary output regulator enabled or disabled by the output detector feedback signal. The auxiliary output regulator is connected to an auxiliary output feedback circuit, thereby providing closed loop control. The controller also includes a welding regulator enabled or disabled by the output detector feedback, such that one and only one of the auxiliary output regulator and welding regulator is enabled.

The controller is an electronic field controller in one embodiment.

The auxiliary output regulator includes a CV regulator and/or a power regulator responsive to the at least one feedback signal in various embodiments.

The power regulator includes a maximum auxiliary power output circuit such that a maximum auxiliary power output is available in the absence of the welding output, and less then the maximum auxiliary power output is available in the presence of the welding output, in another alternative.

An idle feedback signal is connected to a delay circuit in another alternative. The idle feedback signal may be an RPM feedback signal.

The controller includes a current feedback and voltage feedback in other embodiments.

Other principal features and advantages of the invention will become apparent to those skilled in the art upon review of the following drawings, the detailed description and the appended claims.

Figure 1:
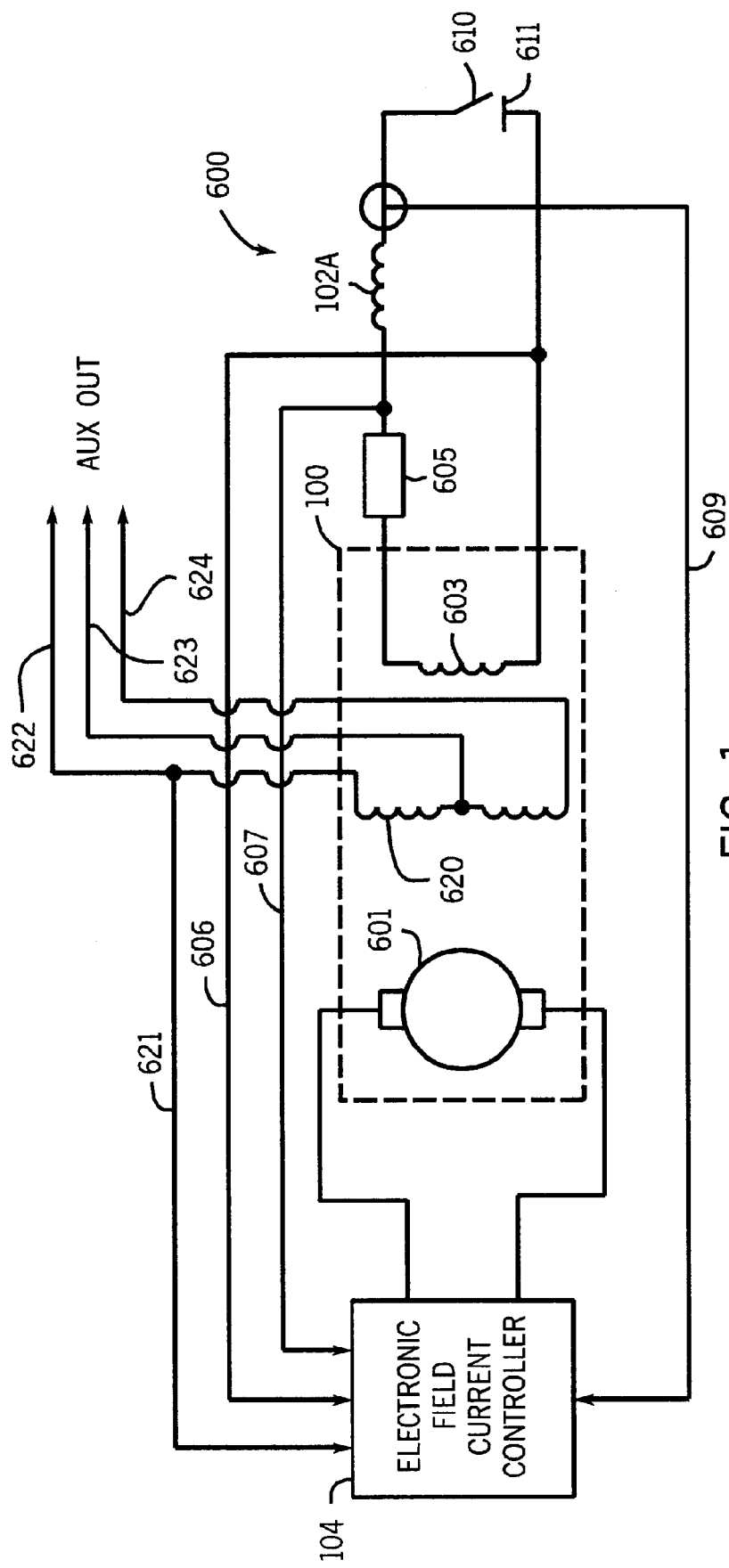
FIG. 1 is a diagram of a welding power supply constructed in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular engine/generator driven welding power supply, a particular controller, a particular control scheme, and particular circuitry, it should be understood at the outset that the invention may also be employed for power supplies other than welding, and may be implemented using other engine/generators, power supplies, controllers, control schemes, and circuitry.

The present invention is described with respect to an engine driven generator welding power supply, such as that shown in U.S. Pat. No. 5,734,147. The details of the electronic field controller, as it relates to the welding output (current, voltage and/or power), will not be described herein, but are described in detail in U.S. Pat. No. 5,734,147. (As used herein electronic controller refers to a controller using digital, analog, or a combination of digital and analog components.)

An AC generator driven power supply 600, according to one embodiment of the present invention, is shown in FIG. 1, and includes a generator 100, an electronic controller 104 for regulating the welding and auxiliary outputs, an output rectifier 605, an output inductor or filter 102A, weld feedback lines 606, 607 and 609, auxiliary output lines 622, 623 and 624, and auxiliary feedback line 621. Power supply 600 provides current at a desired voltage to electrode 610 and workpiece 611. Before describing the details of the present invention, the engine driven generator welding power supply will be described generally.

Generator 100 includes a rotor 601, a stator 603, and an auxiliary output windings 620. The generator may be either a three phase or a single phase generator. Rotor 601 includes field windings that create the field from which power is derived by stator 603. The voltage and current derived by stator 603 is responsive to the magnitude of the field current provided to rotor 601. The output of stator 603 is provided to rectifier 605 and output inductor 102A which provides the welding output of power supply 600. The field current magnitude is responsive to electronic field current controller 104. Thus, electronic field current controller 104 indirectly controls the output of power supply 600.

Feedback from the welding output is provided on lines 606, 607 and 609. Voltage feedback is obtained from the output of rectifier 605, and is fed back to electronic field current controller 104 via lines 606 and 607. Current feedback is obtained by a current sense device and is fed back to electronic field current controller 104 via line 609. Electronic field current controller 104 uses the current and voltage feedback to control the field current in such a manner as to provide a desired output current and voltage. By using an appropriate control scheme (such as described in U.S. Pat. No. 5,734,147) the AC generator driven power supply 600 may provide an output that closely approximates the output of a DC generator driven power supply. Such an output includes a slope in the output V-A curve, and possibly multiple breakpoints.

Generator 100 and an output filter 102A provide output power to a load. Generator 100 may be a three phase AC generator, a single phase AC generator, or, in alternative embodiments, a DC generator. Output filter 102A is an inductor, but includes other filtering components, such as capacitors and resistors, appropriately selected for the desired application, as is well known in the art.

Electronic field controller 104 includes a frequency to voltage converter, a welding voltage regulator, a welding current regulator, a curve shaping circuit, a set point adjust, a welding decoupling circuit, and a pulse width modulator (PWM) circuit (individually and collectively a welding regulator). The welding voltage regulator receives inputs indicative of welding current and voltage. (Welding current, welding output, welding power and welding voltage refer to the main the output of the power supply, which is used for welding in the preferred embodiment. However, in other embodiments the main output of the power supply is used for other purposes, such as plasma cutting, or other high power loads.) Using these inputs, the welding voltage regulator controls the field current and sets the open circuit output voltage of the power supply to a preselected value.

Generally, according to the present invention auxiliary output windings 620 are used to provide an auxiliary power output (current, voltage and/or power). The auxiliary output is often used to power tools, lights, etc., that are powered by 110 VAC. Thus, the auxiliary output is 110 VAC in the preferred embodiment, but may be 240 VAC, better or 480 VAC in alternative embodiments. The output may be single phase or three phase. The feedback line 621 provides feedback indicating whether or not auxiliary output is being used, and the auxiliary voltage (and current in some embodiments) being drawn by the auxiliary load. Generally, electronic field controller 104 controls the field current such that, in the event that no welding power is being used, the auxiliary output is a constant voltage output.

The signals used to determine if the welding and/or auxiliary output is being used may be derived from line 609 and line 621, or may be derived from a switch on the control panel, indicating whether or not the user selects welding and/or auxiliary output. According to one embodiment, the frequency of the auxiliary output is dependent upon the presence or absence a welding output. When a welding output is being provided, the generator runs at a higher rpm, and the auxiliary output will be at approximately 100 Hz. However, when an auxiliary output is being provided, the generator runs at an idle rpm, and the auxiliary output will be at approximately 60 Hz.

Figure 2:
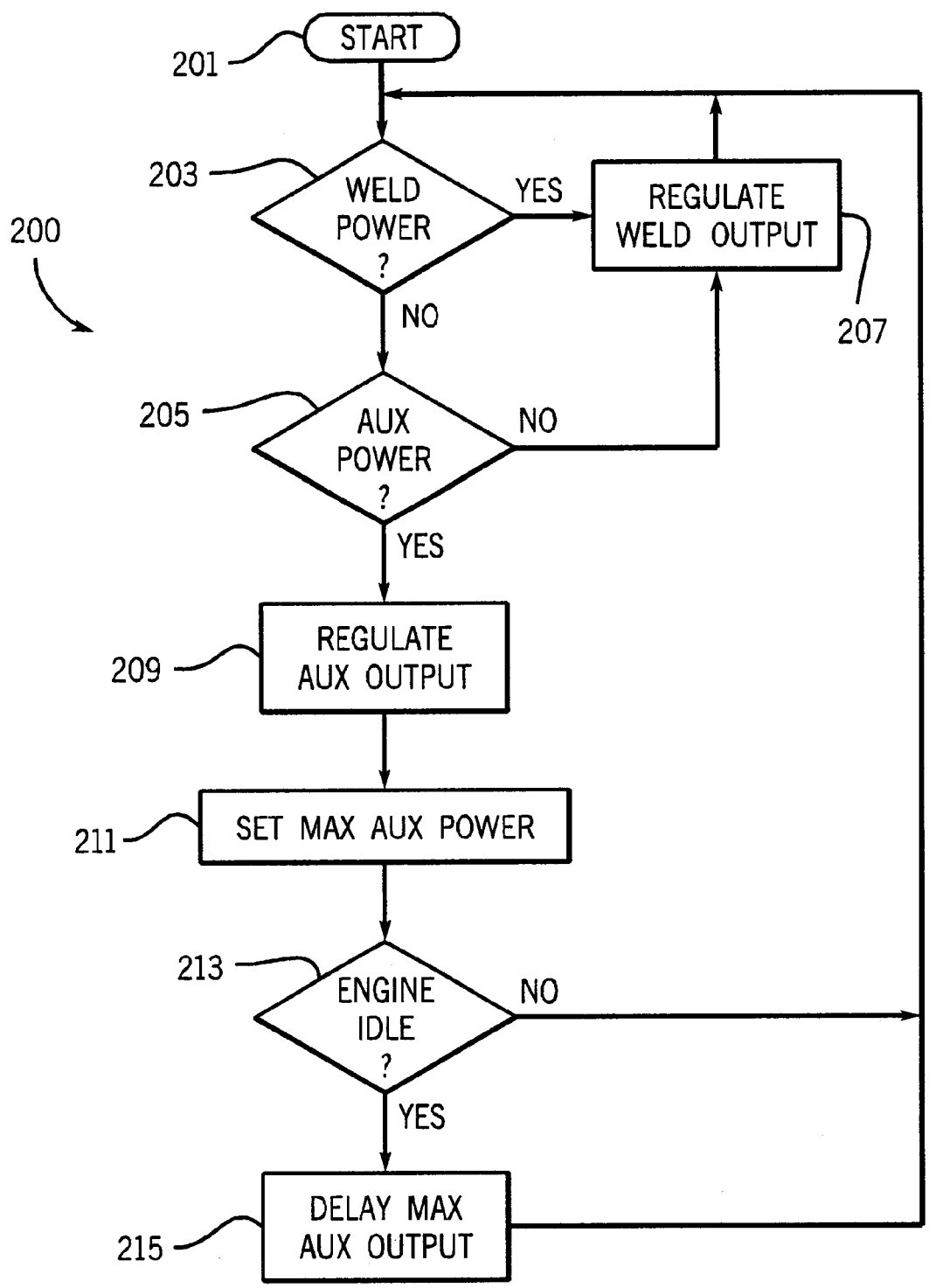
FIG. 2 is a flow chart of a control scheme in accordance with the present invention.

A flow chart showing one control scheme which implements the present invention is shown in FIG. 2 and begins at step 201. At decision 203 it is determined whether or not the user is using welding power. The determination of whether or not welding power is being used may be performed by monitoring the welding output, or by monitoring settings to the control panel, or any other manner.

If welding power is being used, then regulation is done of the welding output at action 207. Regulating the welding power may be performed using any control scheme, and in the preferred embodiment, is done using the prior art control of U.S. Pat. No. 5,734,147.

If welding power is not being used, then at decision 205 it is determined whether not auxiliary power is being used. Again, this determination may be made by monitoring the auxiliary output, or by monitoring switches or settings on the control panel.

If auxiliary power is not being used, then the controller regulates the welding output, at action 207. However, if auxiliary power is being used, then the controller regulates the auxiliary output at action 209 (such as a CV regulator that controls the field current to provide a CV output). In various embodiments decision 205 may be omitted.

The maximum auxiliary power is then set at action 211. This ensures that the power provided will be within the capability of the engine, and that excessive power output will not cause the engine to stall. In various embodiments, this is also used to insure that the engine may operate at the desired rpm, yet not stall when the maximum auxiliary load is being drawn. For example, in one embodiment the engine provides a 60 Hz output at idle, and a 100 Hz output at full run. These frequencies are based upon, and are devisors of, the engine rpm. Thus, less auxiliary power will be available when operating at 60 Hz, than when operating at 100 Hz. Accordingly, the maximum auxiliary power must be less at 60 Hz than at 100 Hz. In various embodiments action 211 is not performed.

At decision 213 it is determined if the engine is idling. If the engine is not idling the control scheme returns to the beginning. If the engine is idling, then at action 215 a delay is implemented before the maximum auxiliary output is provided. This delay is approximately 1 second in the preferred embodiment, and helps to prevent stalling of the engine when full power is needed by the load, but the engine is idling and would be unable to provide full power without stalling. The determination of whether not the engine is idling may be done by monitoring the rpm of the engine, by monitoring control settings on the front panel, or by monitoring the command signal to the solenoid which controls the engine throttle. The step may be omitted in various embodiments.

Figure 3:
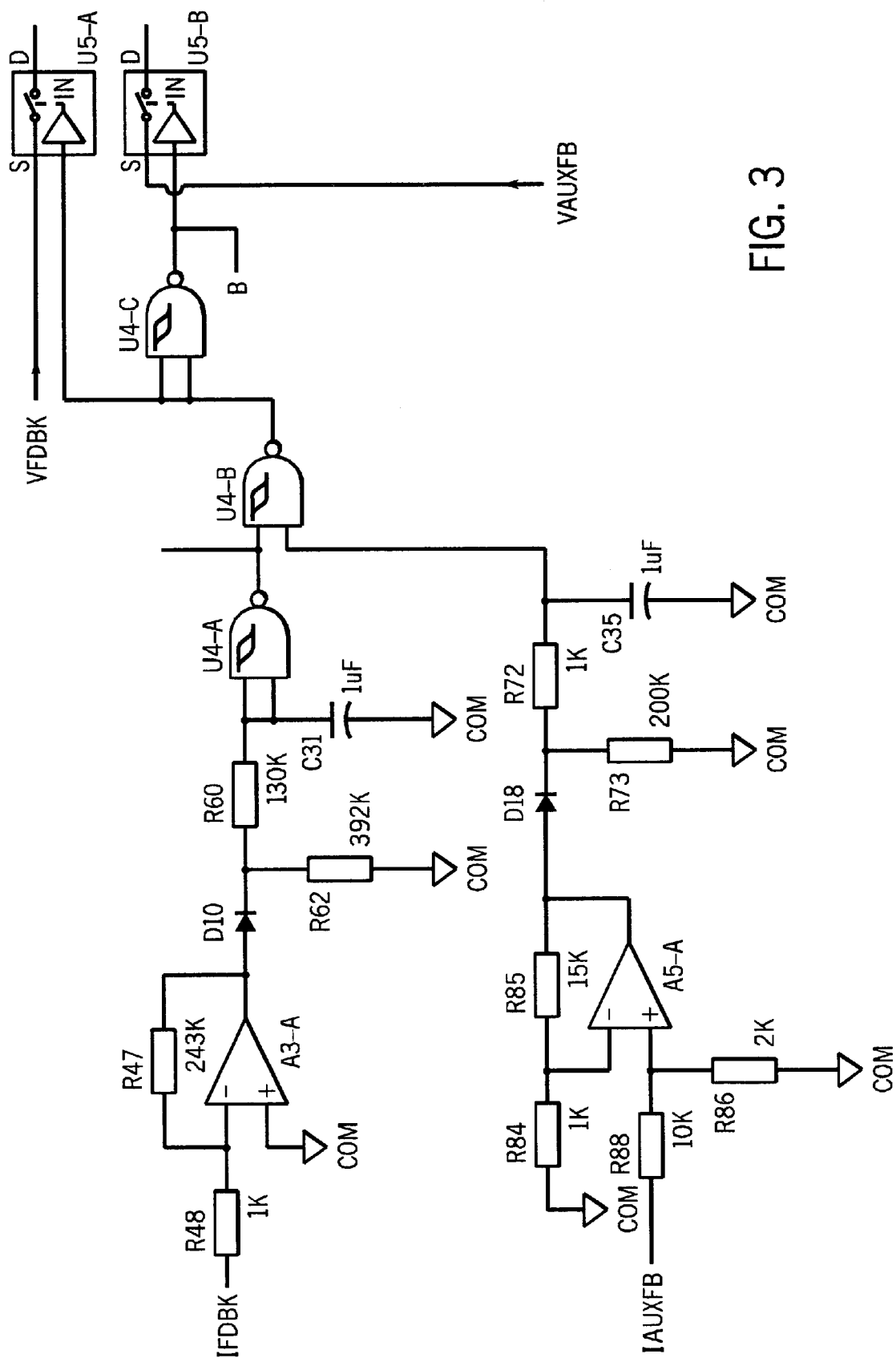
FIG. 3 is a diagram of a control circuit in accordance with the present invention.

FIG. 3 is a diagram of a circuit that implements the preferred embodiment an output detector in controller 104 that includes the logic for choosing between regulating the welding output, and regulating the auxiliary output (preferably to provide a CV output). The circuitry in FIG. 3 may be implemented using other circuitry, digital circuitry such as a microprocessor, or combination thereof.

The welding current feedback signal (IFDBK) is provided through a resistor R48 (1K ohm) to an op amp A3A, a resistor R47 (243K ohms), a diode D10, and an RC network comprised of resistors R62 (392K ohms), R60 (130K ohms), and capacitor C31 (1 $\mu$F). These components scale the welding current feedback signal (IFDBK) such that output of op amp A3A through the RC network will be logic high when welding is being performed, and logic low when no welding is being performed.

The scaled IFDBK is provided to both inputs of a NAND gate U4-A. Thus, if welding current is present, the input to NAND gate U4A is high, and its output is low. Conversely, if welding current is not present, the input to NAND gate U4A is low, and its output is high.

The output of NAND gate U4-A is provided to one input of a NAND gate U4-B. The output of NAND gate U4-B is provided to the control (enable) input of switch U5A. If welding current is present, the input to NAND gate U4B is low, and its output is high, thus closing switch U5A. (If welding current is not present, the input to NAND gate U4B is high, and its output depends upon the second input.) Switch U5A, when closed, connects the welding voltage feedback signal (VFDBK) to the portion of the controller that regulates voltage.

The second input to NAND gate U4-B is derived from the auxiliary current feedback signal (IAUXFB). IAUXFB is provided through a scaling circuit (similar to the circuit for IFDBK) comprised of a resistor R88 (1K ohm), an op amp A5A, a resistor R86 (2K ohms), a resistor R84 (1K ohms), a resistor R85 (15K ohms), a diode D18, and an RC network comprised of resistors R73 (200K ohms), R72 (1K ohms), and capacitor C35 (1 $\mu$F). These components scale the auxiliary current feedback signal (IAUXFB) such that output of op amp A5A through the RC network will be logic high when auxiliary current is being drawn, and logic low when no auxiliary current is being drawn.

If no auxiliary current is present, the input to NAND gate U4B is low, and its output is high, thus closing switch U5A. This connects the welding voltage feedback signal (VFDBK) to the portion of the controller that regulates voltage. If auxiliary current is present, the second input to NAND gate U4B is high, and its output depends upon the welding current input.

The output of NAND gate U4-B is also provided to NAND gate U4-C, which acts as a NOT gate. Thus, the output of NAND gate U4-C is high when the output of NAND gate U4-B is low, and the output of NAND gate U4-C is low when the output of NAND gate U4-B is high. The output of NAND gate U4-C is provided to the control (enable) input of switch U5B. Switch U5B, when closed, connects the auxiliary voltage feedback signal (VAUXFB) to the portion of the controller that regulates voltage, thus forming an auxiliary feedback circuit.

Thus, at all times one, and only one, of the welding and auxiliary voltage feedback signals is provided to the regulator. When welding current is present the welding voltage feedback signal is provided to the regulator (and the auxiliary voltage feedback signal is not). When welding current is not present and auxiliary current is present the auxiliary voltage feedback signal is provided to the regulator (and the welding voltage feedback signal is not). When neither welding current nor auxiliary current is present the welding voltage feedback signal is provided to the regulator (and the auxiliary voltage feedback signal is not).

Switches U5A AND U5B are a welding enable input and an auxiliary enable input. In alternatives they may be part of a single switch (and the portion of the single switch turning the auxiliary regulator on and off is the auxiliary enable input and the portion of the single switch turning the welding regulator on and off is the welding enable input). Similarly, a single feedback/logic circuit is shown, but separate circuits for the auxiliary and welding enable inputs could be provided, and collectively comprise a feedback circuit. The logic circuitry preceding the switches may be considered part of the feedback circuit, or part of the enable circuitry.

The particular control shown is the preferred embodiment, and other controls may be used. For example, when neither weld nor auxiliary current is present, the control could default to auxiliary. Also, auxiliary could be chosen when both are present. Other alternatives provide for different input signals, such as signals derived from panel settings, to select between auxiliary and welding regulation.

Figure 4:
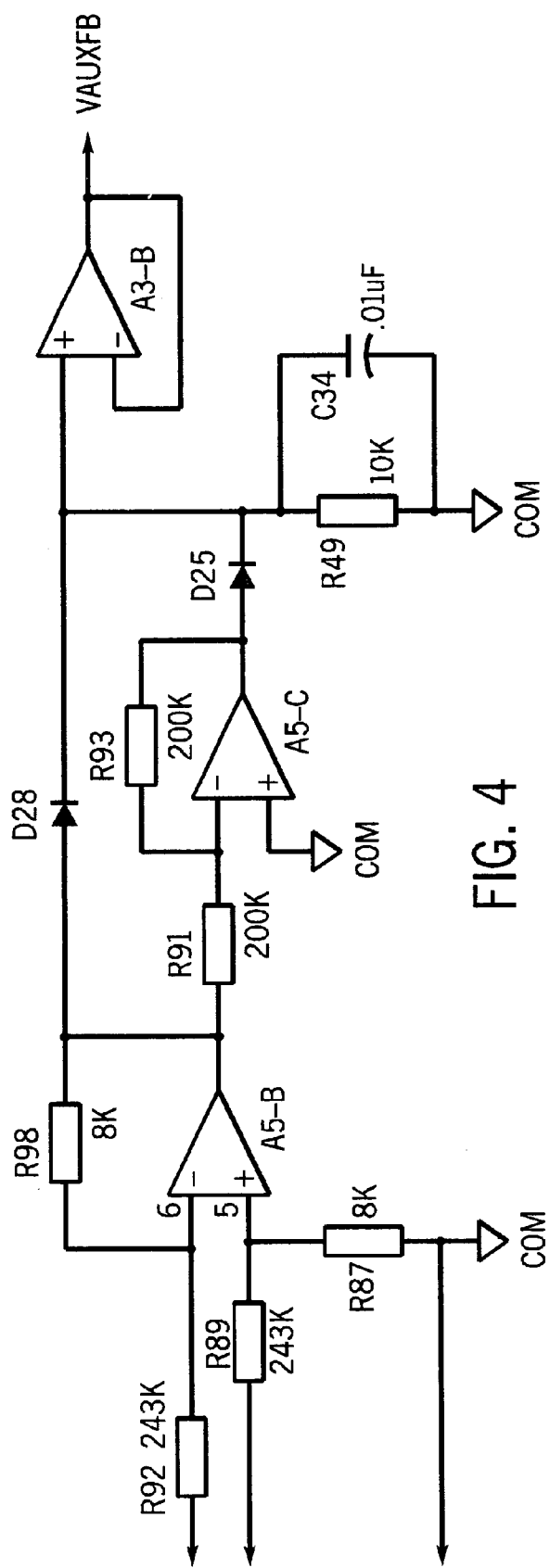
FIG. 4 is a diagram of part of a control circuit in accordance with the present invention.

FIG. 4 is a diagram of a circuit that implements the preferred embodiment for the portion of controller 104 that receives auxiliary voltage feedback and creates the signal VAUXFB provided to switch U5B (FIG. 3). The auxiliary voltage is fed to a difference op amp A5B, having scaling resistors R92 (243K ohms), R89 (243K ohms), R90 (8K ohms), R87 (8K ohms). The output of op amp A5B (indicative of the voltage across the auxiliary outputs), is provided to inverting op amp A5C having resistors R91 (200K ohms) and resistors R93 (200K ohms). The inverted signal is provided through a diode D25 and an RC network comprised of resistor R49 (10K ohms) and capacitor C34 (0.01 $\mu$F) to a buffering op amp A3B. The output of op amp A3B (VAUXFB) is provided to switch U5B (FIG. 3), and is used by the controller to regulate the auxiliary voltage to provide a CV output. In the preferred embodiment the regulation is a field current control, such as that taught by U.S. Pat. No. 5,734,147.

Figure 5:
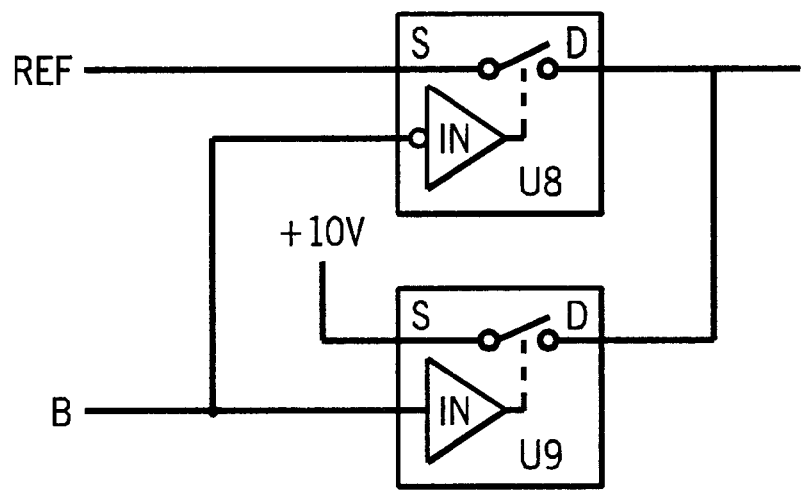
FIG. 5 is a diagram of part of a control circuit in accordance with the present invention.

FIG. 5 is a diagram of a circuit that implements the preferred embodiment for the portion of the controller that sets the maximum auxiliary output. Input B (from FIG. 3, and indicates the presence or absence of welding output) is used to control switches U8 and U9. One of switches U8 and U9 will be on, depending on the state of input B, and this will select either a 10V signal setting the maximum auxiliary, or use the control reference (derived from a user adjustable potentiometer on the control panel) in the preferred embodiment) limiting the maximum auxiliary power output.

Figure 6:
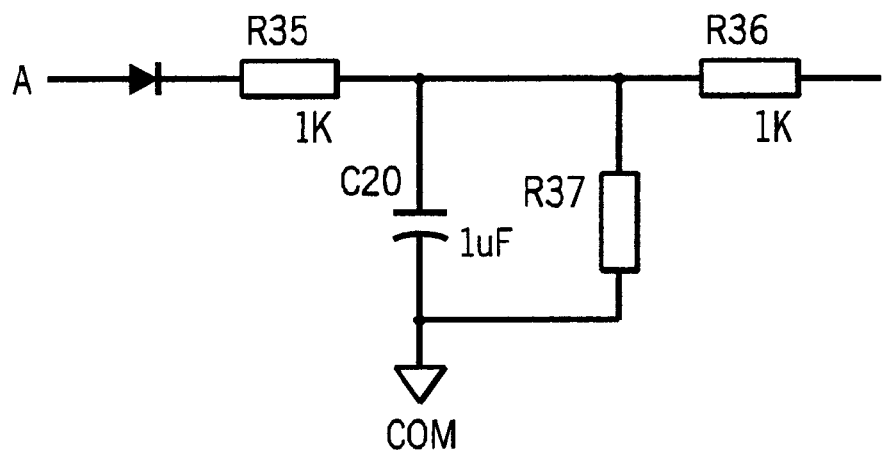
FIG. 6 is a diagram of part of a control circuit in accordance with the present invention.

FIG. 6 is a diagram of a circuit that implements the preferred embodiment for the portion of the controller that creates the delay before going to maximum auxiliary power output, to prevent engine stalling. Input A is the control signal for the solenoid that controls the throttle to select either idle or run for the engine, and thus indicative of whether the engine is idling or running. Alternatively it may be from an rpm circuit or a setting on the control panel. Input A is provided through a diode D11 and an RC network comprised of resistor R35 (1K ohm), capacitor C20 (1 $\mu$F), resistor R37 (1.5M ohms) and resistor R36 (1K ohm). The output of the RC network is provided to a switch in the regulator that controls the field current. When the switch is open field current is inhibited to prevent the engine from stalling at low rpm. The RC network has a time constant that sets the delay (approximately 1 second in the preferred embodiment) in closing the switch.

The circuitry described in reference to FIGS. 3–6, and the control circuitry described in U.S. Pat. No. 5,734,147 used to regulate power, voltage, current, etc. are, collectively and individually, an auxiliary output regulator, because they are used to control the auxiliary output. Thus, where possible, circuitry forming part of the welding regulator may be used as part of the auxiliary output regulator. This helps reduce complexity and cost.

Numerous modifications may be made to the present invention which still fall within the intended scope hereof. Thus, it should be apparent that there has been provided in accordance with the present invention a method and apparatus for controlling welding or other main and auxiliary power that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A generator driven welding power supply for providing a welding output and an auxiliary output comprising:
   a generator, including a field winding, an auxiliary output winding and a welding output winding;
   an output detector, disposed to detect an auxiliary output, and capable of providing at least one feedback signal indicative of the presence or absence of the auxiliary output;
   an auxiliary output feedback circuit; and
   a controller including an auxiliary output regulator with an auxiliary enable input responsive to the output detector feedback signal, and a feedback input connected to the auxiliary output feedback circuit, and further including a welding regulator with a power enable input responsive to the output detector feedback, whereby one of the auxiliary output regulator and welding regulator is enabled.

2. The apparatus of claim 1, wherein the controller is an electronic field controller connected to the field winding.

3. The apparatus of claim 1, wherein the auxiliary output regulator includes a CV regulator, and the auxiliary feedback circuit includes a voltage feedback circuit.

4. The apparatus of claim 3, including an idle feedback circuit and wherein the power regulator includes a delay circuit responsive to the idle feedback circuit.

5. The apparatus of claim 4 wherein the idle feedback circuit includes an RPM feedback circuit.

6. The apparatus of claim 1, wherein the auxiliary output regulator includes a power regulator responsive to the at least one feedback signal.

7. The apparatus of claim 6, wherein the power regulator includes a maximum auxiliary power output circuit responsive to the at least one feedback signal.

8. The apparatus of claim 1, wherein the controller has a current feedback input and a voltage feedback input.

9. A generator driven welding power supply for providing a welding output and an auxiliary output comprising:
   a generator, including a field winding, an auxiliary output winding and a welding output winding;
   an output detector, disposed to detect a welding output and an auxiliary output, and capable of providing feedback indicative of the presence or absence of the auxiliary output;
   an auxiliary voltage feedback circuit; and
   an electronic field controller connected to the field winding, wherein the electronic field controller includes an auxiliary output regulator with a CV regulator circuit connected to the auxiliary voltage feedback circuit, and an auxiliary enable input responsive to the output detector feedback signal, and further including a welding regulator with a power enable input responsive to the output detector feedback, whereby one of the auxiliary output regulator and welding regulator is enabled.

10. The apparatus of claim 9, wherein the auxiliary output regulator includes a power regulator responsive to the at least one feedback signal such that a maximum auxiliary power output is available when the output detector indicates the presence of the auxiliary output.

11. The apparatus of claim 10, including an idle feedback circuit and wherein the power regulator includes a delay circuit responsive to the idle feedback circuit.

12. The apparatus of claim 11, wherein the idle feedback circuit includes an RPM feedback circuit.

13. A generator driven welding power supply for providing a welding output and an auxiliary output comprising:

a generator, including a field winding, an auxiliary output winding and a welding output winding;

an output detector means for detecting an auxiliary output, an t for providing at least one feedback signal indicative of the presence or absence of the auxiliary output; and auxiliary output feedback means for providing feedback indicative of the auxiliary output;

controller means for electronically controlling the welding and auxiliary outputs, the controller means being connected to the output detector feedback signal, the controller means including an auxiliary regulator means for regulating the auxiliary output in response to the feedback indicative of the auxiliary output by controlling the field current in the presence of auxiliary output, and the controller means including a welding regulator means for regulating the welding output.

14. The apparatus of claim 13, wherein the controller means includes means for controlling the field current.

15. The apparatus of claim 13, wherein the auxiliary regulator means includes means for regulating to a constant voltage.

16. The apparatus of claim 15, wherein the auxiliary regulator means includes means for regulating auxiliary power in response to the at least one feedback signal.

17. The apparatus of claim 16, wherein the power regulator means includes means for regulating to a maximum auxiliary power output.

18. The apparatus of claim 16, including a delay means for delaying the providing of maximum auxiliary power in response to an idle feedback signal.

19. The apparatus of claim 18, wherein the delay means includes means for delaying the providing of maximum auxiliary power in response to RPM feedback.

20. The apparatus of claim 13, wherein the electronic field controller means includes means for receiving a current feedback and a voltage feedback.

21. A method of a welding output and an auxiliary output comprising:

generating electric power using a generator including a field winding, an auxiliary output winding and a welding output winding;

detecting an auxiliary output, and providing at least one feedback signal indicative of the presence or absence of the auxiliary output;

regulating the auxiliary output in response to the auxiliary output by controlling the field current in the presence of auxiliary output; and regulating the welding output by controlling the field current.

22. The method of claim 21, wherein regulating the auxiliary output includes regulating to a constant voltage.

23. The method of claim 21, wherein auxiliary output power is regulated in response to the at least zone feedback signal.

24. The method of claim 23, wherein the auxiliary power output is regulated to a maximum.

25. The method of claim 24, including delaying the providing of maximum auxiliary power in response to the engine idling.

26. The method of claim 25, including receiving a current feedback and a voltage feedback.

27. The method of claim 26, including delaying the providing of maximum auxiliary power in response to the RPM of the engine.

* * * * *